UNITED STATES PATENT OFFICE.

ROYAL S. DAVIS, OF NEWMIRE, COLORADO, ASSIGNOR TO PRIMOS CHEMICAL COMPANY, OF PRIMOS, PENNSYLVANIA, A CORPORATION OF PENNSYLVANIA.

METHOD OF TREATING VANADIUM-BEARING ORES.

1,223,567.  Specification of Letters Patent.  Patented Apr. 24, 1917.

No Drawing.  Application filed July 28, 1914.  Serial No. 853,725.

*To all whom it may concern:*

Be it known that I, ROYAL S. DAVIS, a citizen of the United States, residing at Newmire, San Miguel county, Colorado, have invented a certain new and useful Method of Treating Vanadium-Bearing Ores, of which the following is a specification.

This invention relates to an improved method of treating vanadium bearing ores and has particular reference to the recovery of values ordinarily rejected when treating the ore preparatory for reduction.

In the treatment of vanadium ores for subsequent reduction, I subject the ores to a chloridizing roast in a reverberatory furnace, or the like, in order to change the vanadium compound containing vanadium in the form of $V_2O_3$, into a vanadate containing vanadium in the form of $V_2O_5$, in which condition it is best suited for reduction by what is known as the alumino-thermic process. The preferred form of roast I employ is a chloridizing roast in which a chlorid, such, for example, as sodium chlorid, is used, which on the application of heat breaks up into chlorin and sodium. The chlorin passes off and the sodium is free to unite with the vanadium to form a vanadate. The roasted ore is then leached, and I have found that the residue still contains recoverable quantities of vanadium in the form of $V_2O_3$, and it is the purpose of my invention to recover these values in a simple and economical manner.

A number of fumes are given off in the reactions which take place in the chloridizing roasts just above described, such, for example, as hydrochloric acid, chlorin, carbon dioxid, and sulfuric acid, and certain of these fumes are solvents of vanadium. The reactions which produce the above fumes are:—

$$V_2O_3 + 2NaCl + H_2O + O_2 = 2NaVO_3 + 2HCl$$

$$V_2O_3 + 2NaCl + 3O = 2NaVO_3 + Cl_2$$

$$CaCO_3 + heat = CaO + CO_2$$

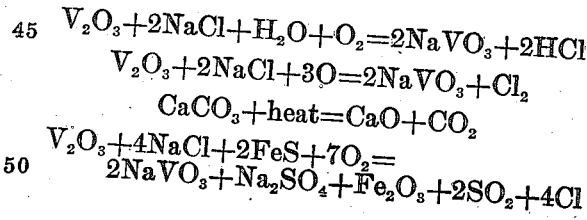

The Cl and $SO_2$ on coming into contact with moist air form:

$$2HCl + H_2SO_4,$$

the reaction being $$2Cl + SO_2 + 2H_2O = 2HCl + H_2SO_4.$$

In carrying out my invention, I prefer to cool the gases coming from the roaster in any suitable manner, as by the use of an ordinary regenerator, and then to pass the cool gases through water in a collecting device, such as a coke tower, allowing the water to absorb the fumes. This step is ordinarily termed "scrubbing the gases" and forms a weak solution of the solvent. I then apply this solution to the roasted ore either directly after roasting or after the vanadium ore has been leached. The solution dissolves the vanadium in the ore into a weak solution containing soluble vanadates, which can readily be precipitated in any well known manner, as by using iron-sulfate. It is also possible to apply the cool fumes directly to the moist ore, that is, without previously scrubbing the fumes, and thereafter washing out the soluble vanadates formed by the use of water.

It will be seen from the foregoing that I employ the fumes given off in a chloridizing roast which have heretofore been wasted, to produce a soluble vanadate, and I have found that the extraction is increased substantially from 10 to 15 per cent. over the ordinary water leach processes. The cost of collecting the fumes is nominal, so it will be apparent that my improved method is very inexpensive.

I claim:—

1. The herein described process of treating vanadium ores, which consists in subjecting the ores to a chloridizing roast, and then in applying in the presence of moisture the solvent fumes given off to the roasted ore to produce a soluble vanadate.

2. The herein described process of treating vanadium ores, which consists in subjecting the ores to a chloridizing roast, in cooling the fumes given off in such roast, and then in applying the cooled fumes to the roasted ore in the presence of moisture to form a soluble vanadate.

3. The herein described process of treating vanadium ores, which consists in subjecting the ores to a chloridizing roast, in cooling the fumes given off in such roast, in scrubbing the fumes, and then in applying the resultant solution to the roasted ore to form a soluble vanadate.

4. The herein described process of treating vanadium ores, which consists in subjecting the ores to a chloridizing roast, in leaching the roasted ore, and then in applying to the resultant residue the fumes given off in the roast to form a soluble vanadate.

5. The herein described process of treating vanadium ores, which consists in subjecting the ores to a chloridizing roast, in leaching the roasted ore, and then in applying to the resultant residue a solution obtained by scrubbing the fumes given off in the roast with water to form a soluble vanadate.

6. The herein described process of treating vanadium ores, which consists in subjecting the ores to a chloridizing roast, in leaching the roasted ore, in cooling the fumes formed during the roast, and then in applying the cooled fumes to the residue to form a soluble vanadate.

7. The herein described process of treating vanadium ores, which consists in subjecting the ores to a chloridizing roast, in leaching the roasted ore, in cooling the fumes formed during the roast, in passing the fumes through water, and then in applying the resultant solution to the residue after leaching to form a soluble vanadate.

ROYAL S. DAVIS.

Witnesses:
H. R. MOSLEY,
JAS. E. BIRCH.